May 23, 1967 R. H. MacKAY 3,321,258
CART FOR TRANSPORTING FOOD TRAYS AND THE LIKE
Filed Aug. 17, 1965 4 Sheets-Sheet 1

INVENTOR
ROBERT H. MacKAY
by JEFFERS & YOUNG
ATTORNEYS

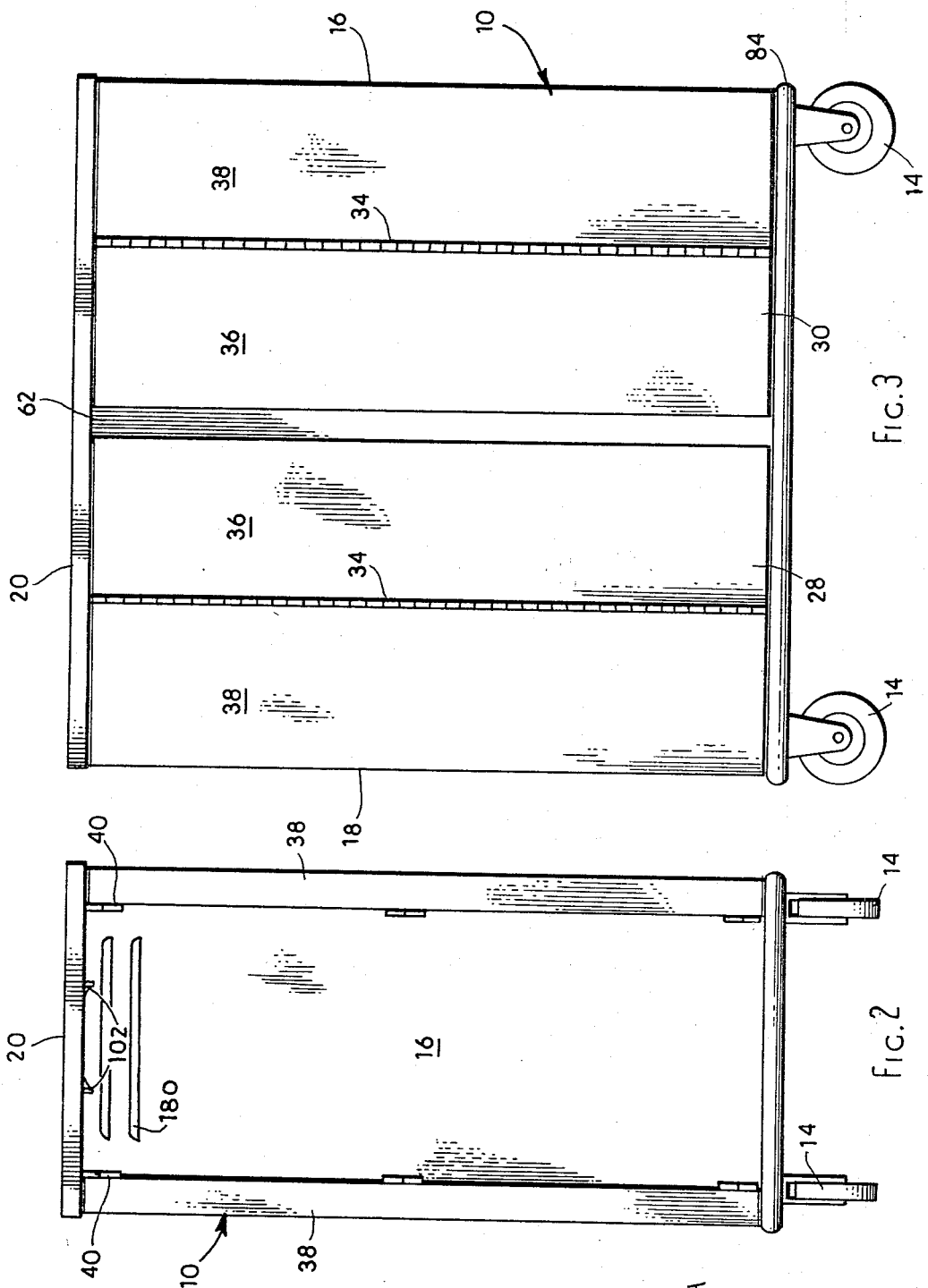

May 23, 1967   R. H. MacKAY   3,321,258
CART FOR TRANSPORTING FOOD TRAYS AND THE LIKE
Filed Aug. 17, 1965   4 Sheets-Sheet 3

INVENTOR
ROBERT H. MacKAY
by JEFFERS & YOUNG
ATTORNEYS

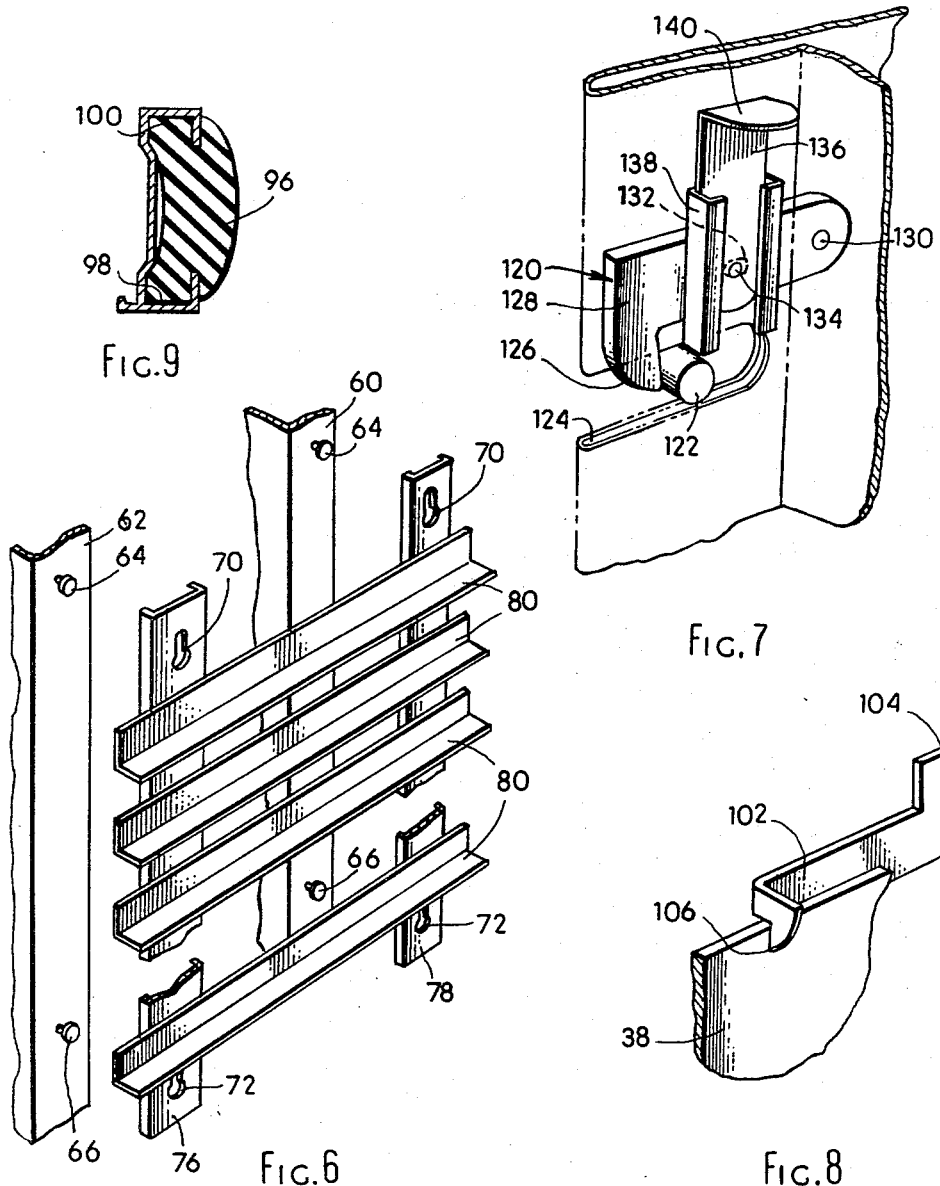

United States Patent Office 3,321,258
Patented May 23, 1967

3,321,258
CART FOR TRANSPORTING FOOD TRAYS
AND THE LIKE
Robert H. MacKay, Fort Wayne, Ind., assignor to Lincoln Manufacturing Co., Inc., Fort Wayne, Ind., a corporation of Indiana
Filed Aug. 17, 1965, Ser. No. 480,299
5 Claims. (Cl. 312—250)

This invention relates to an improved cart for transporting food trays and the like, and more particularly to a cart which is adapted for both storing and transporting food trays which are refrigerated and then heated in preparation for distribution.

One of the important features of a transportable cart for distributing food trays is that the cart be readily loaded and unloaded and that the trays of food can be refrigerated and stored in refrigerated condition for as long as need be, and then transported to a convenient location where the containers of food can be heated up in preparation for serving.

The cart is useful for transporting food either in heated or refrigerated condition, and for returning the empty trays for cleaning and re-use. It is one of the requisites for a transportation cart used in storing and distributing food containers that the cart be readily cleanable. In order to accomplish this, it is an important feature of the present invention that components of the cart be removable for more convenient and efficient cleaning, and exposing all surfaces of the cart so that all portions thereof are thoroughly and effectively cleaned. Obviously, if portions of the cart are inaccessible this will detract from the degree of cleanliness and because the cart has widespread application in hospitals such conditions cannot be tolerated.

Accordingly, one of the principal objects of the present invention is to provide an economical and durable cart for transporting food containers and in which various components of the cart can be readily removed for more effective cleaning and for more convenient cleaning so that the cart is at all times in a thoroughly clean and hygienic condition.

It is a further object of the present invention to provide a cart which can store containers of food and is adapted to refrigerate the food trays by providing circulation of air around the trays to more effectively chill the food contents and retain them in a refrigerated condition pending usage.

It is the overall object of the present invention to provide a cart for storing and transporting food containers in which the food containers cannot only be refrigerated and maintained in a refrigerated condition by locating the cart within a cold storage room, but also can insure a free circulation of refrigerated air through the cart to maintain the food trays at the refrigerated temperature.

It is another important object of the present invention to provide a novel arrangement of trays and mounting racks for the trays within the cart so that a free and continuous circulation of refrigerated air is passed over and around each tray to product an efficient cooling of the articles.

It is a still further object of the present invention to provide a novel construction of door whereby the doors can be doubled back and folded into a retracted position and held in such position during unloading, loading and during the period when it is desired to circulate cooling air through the cart.

It is another important feature of the present invention to provide a novel protecting bumper which surrounds the cart and cushions the cart against impact loads.

Other objects and features of the present invention will become apparent from a consideration of the following description which proceeds with reference to the accompanying drawings wherein:

FIGURE 2 is a side elevation view of the cart illustrated in FIGURE 1 in which the doors are in a closed position;

FIGURE 3 is a front elevation view of the cart also with the doors in a closed position;

FIGURE 6 is an enlarged detail isometric view of a rack and mounting means for the rack on which the trays of food are received;

FIGURE 7 is an enlarged isometric detail view of the latch for holding the doors of the cart in closed position;

FIGURE 8 is an enlarged isometric detail view of the latch for holding the door in retracted or folded position; and, FIGURE 9 is a sectional detail view of the bumper, the section view being taken on line 9—9 of FIGURE 1.

Figure 1:
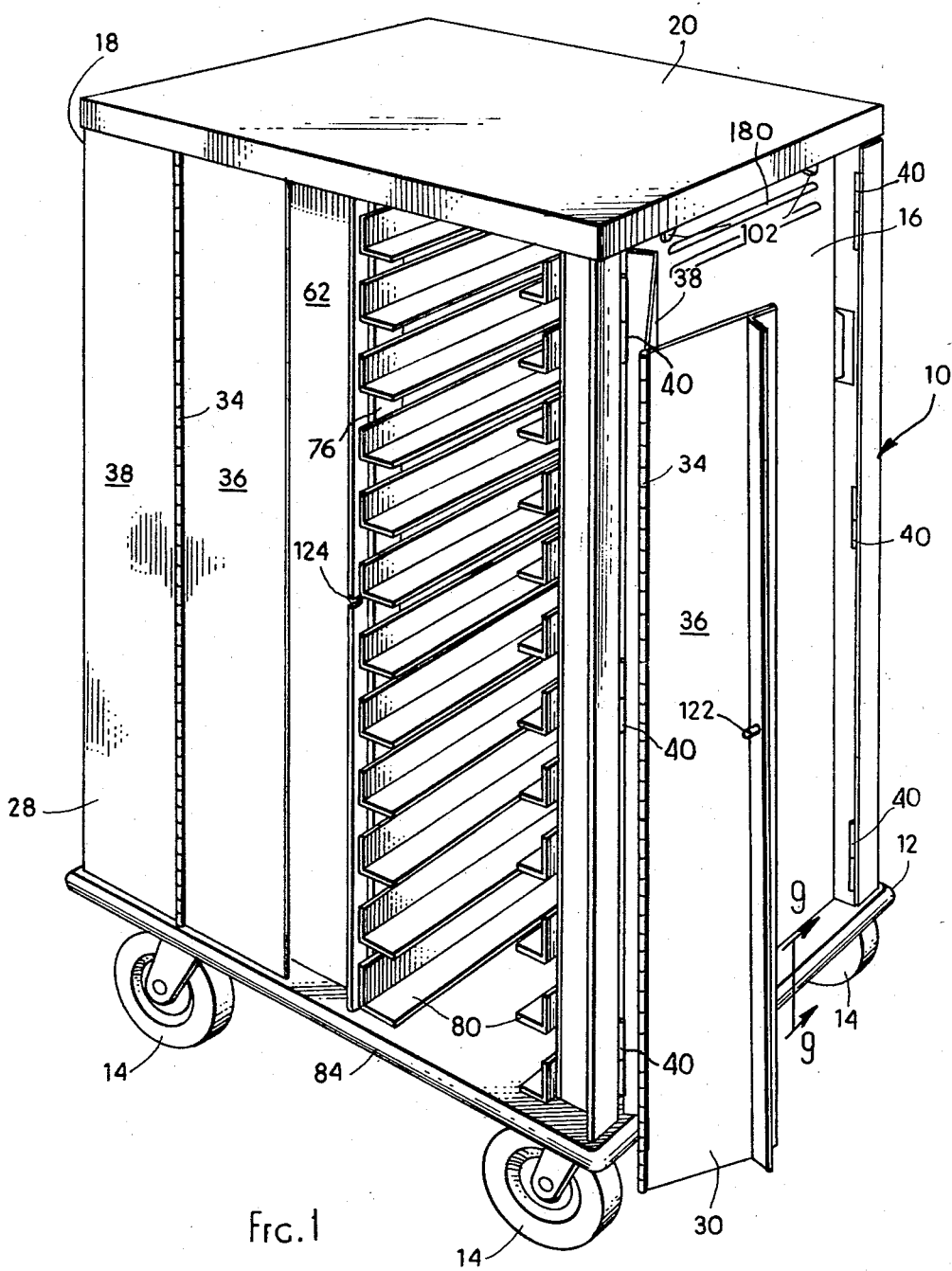
FIGURE 1 is an isometric view of the cart with one of the doors partly open to illustrate the interior of the cart and with containers of food removed from the cart.

Referring now to the drawings, and particularly to FIGURE 1, the cart, designated generally by reference numeral 10, is comprised of a base 12 supported on four corners by castered wheels 14 and includes spaced end walls 16, 18 and overhead wall 20. The two side walls which complete the enclosure are constituted by two pairs of doors designated generally by reference numerals 28 and 30 (FIGURES 1, 3). Both of these doors are capable of doubling back upon each other and then unfolding into retracted position against the end walls 16 and 18. The panels 36, 38 of the doors 28, 30 are doubled back, the panels 38 being hinged at 40 to one or other of the end walls 16, 18 so that the doubled panels can be swung to the retracted position shown in FIGURE 4. The dotted line position of the panels 36, 38 at the upper portion of the figure and the full line position indicated at the lower part of the figure are the retracted positions for the doors.

Figure 4:
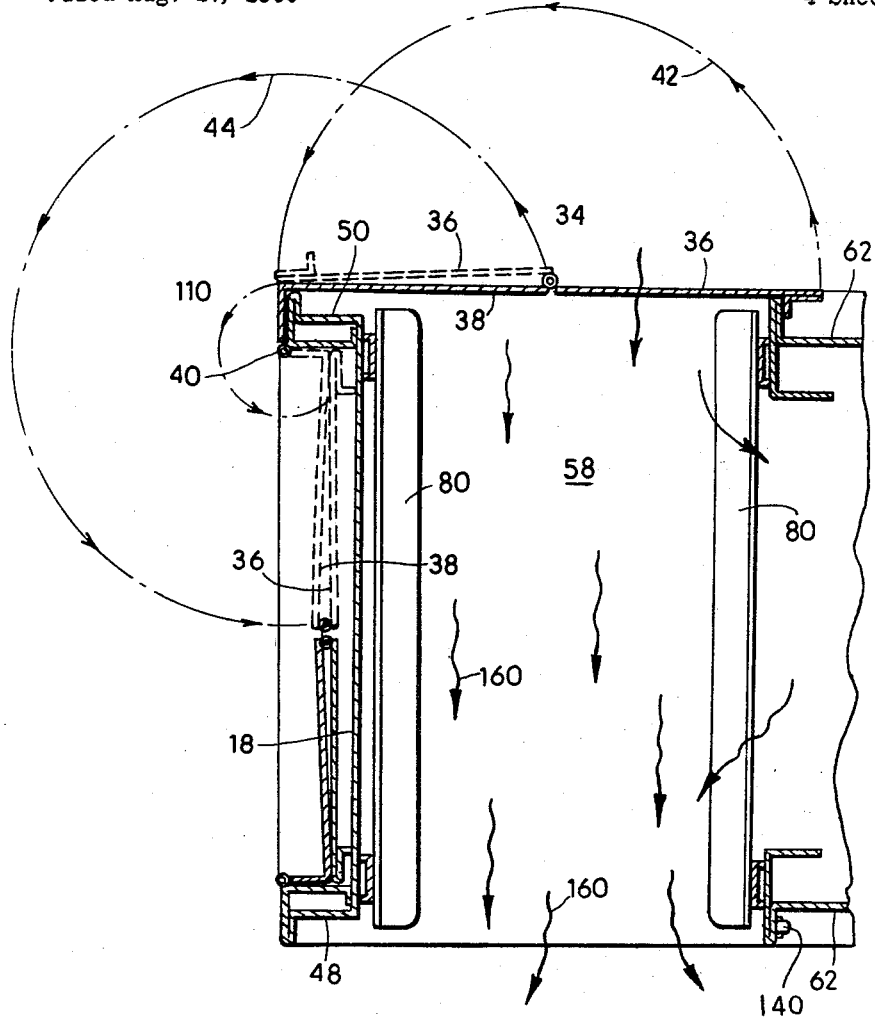
FIGURE 4 is a horizontal section view taken through the cart and illustrating the flow of air through the cart and the movement of the doors of the cart as they are doubled back and then the doubled sections swung to a retracted position.

As indicated in full lines at the upper portion of FIGURE 4 the door is closed when both panels are extended. The door may be opened by the panel 36 being first swung in the direction of thearrow 42 to its dotted line position and then both sections 36, 38 are swung in the direction of arrow 44 about hinge 40 so that panels 36, 38 are retracted against the end wall 18. When both panels are retracted as in FIGURE 4, they are protected by end wall 18.

Figure 5:
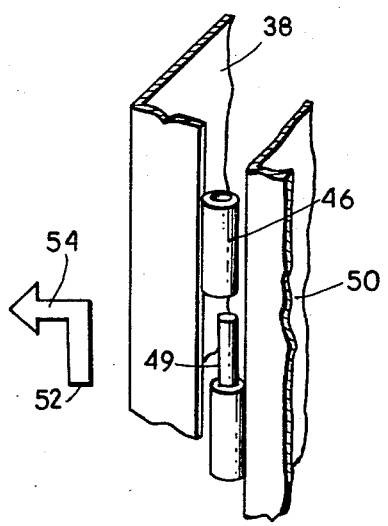
FIGURE 5 is an enlarged detailed view of the hinged arrangement for removing the doors of the cart.

Referring to FIGURE 5, the panels 36, 38 can be removed by simply pulling the hinge 46 upwardly in the direction of the arrow 52 and then outwardly as indicated by the arrow section 54, thus permitting the two panels 36, 38 to be separately removed and cleaned and providing greater accessibility to the interior 58 of the cart.

Within the interior 58 of the cart are vertical mounting members 60, 62 (FIGURE 6) having rivet heads 64, 66 which are adapted to connect with key-shaped openings 70, 72 on spaced braces 76, 78. Braces 76, 78 have welded or riveted thereto the opposite ends of vertically spaced angles 80 (FIGURES 1, 6), the vertical spacing of which is proportioned to receive containers (shown removed) which take support at their opposite edges on the inwardly projecting horizontal portions of the angle members 80.

These spaced angles 80, together with braces 76, 78 are readily removable by picking up and then pulling out, to release the key-shaped openings 70, 72 with the coacting rivets 64, 66 on the vertical support 60, 62 so that the combination braces and angles which form a rack support for the containers can be readily washed.

Also, once the rack is removed, the interior 58 of the cart has all of its surfaces exposed and is readily washable throughout.

Surrounding the bottom of the cart is a bumper 84 (FIGURE 1) which protects the cart against damages from impacting. As shown in FIGURE 9 the bumper 84 consists of a neoprene or other resilient insert 96 which is inserted endwise into a keyway 98 and is held by its flanges 100. The bumper 84 is mounted on the bottom portion of the cart at the base 12.

The bumper 84 not only protcets the cart against injury but also serves to cushion any impact which would tend to jostle the internal load of the cart and cause spillage of food or cause damage to the contents of the food trays.

After the rack (FIGURE 6) is mounted by fitting openings 70, 72 to the rivets 64, 66, the trays are inserted on both sides of the cart onto the angles 80 and the doors are closed by swinging the panels from the retracted position (indicated by dotted lines at the upper part of FIGURE 4) to the full line position.

Each door is held in locked position by a latch, designated generally by reference numeral 120 (FIGURE 7). The latch includes a pin 122 secured to panel 36 (FIGURE 1) and which passes through a slot 124 on each of the vertical supports 60, 62 which are located midway between end walls 16 and 18 (FIGURE 1). When the cam pin 122 enters slot 124 it contacts the follower surface 126 of a locking finger 128 raising it and causing pivoting thereof about pivot pin 130 on the vertical supports 60, 62. The finger 128 has an oblong opening 132 with a pin 134 passing therethrough causing a slide 136 to raise upwardly in track 138 as the finger pivots upwardly (FIGURE 7). After the cam pin 122 passes the follower surface 126, the finger 128 will drop, pivoting counterclockwise about pivot 130 and lowering the slide 136 within track 138 to lock the pin 122 in place, preventing its withdrawal from the slot 124. The slide 136 can be raised manually by the tab 140, pivoting the finger 128 about its pivot 130 and disengaging 126 from the cam pin 122 allowing the pin to move out of the slot 124, when it is desired to open the doors. The doors may be held in an open position as shown in FIGURE 8 by respective latches 102, each of which pivots on a pin 104 and each of which has a hook 106 which restrains the door 38.

When the doors are in closed position (FIGURE 1) the interior 58 is protected and the trays are held in place. When the doors are open there is permitted a circulation of air as indicated by the arrows 160 (FIGURE 4) and this free circulation of air within the spaces provided between vertically adjacent trays of food on the angles 80, there is an effective refrigeration of the food contents of the trays. In the absence of circulation of air there would be ineffective refrigeration. Thus, when the prepared food is first put in the trays and the trays in turn inserted into the cart and it is desired to store the food for a period, the doors are swung open and the cart is stored within a refrigerator room and the cold air will freely circulate as indicated by the arrows 160 in FIGURE 4. At the time of use, the doors are closed and the cart is transported to a point of use at which time the trays are heated and the food is brought to the correct temperature; they are reloaded in the cart and the cart can transport the trays to the point of use.

The carts are then again used to collect the empty trays which are returned for cleaning and reloading. At the time of reloading, the trays are removed and the cart can be sanitized before reloading, the trays being first removed with the doors unhinged in the manner indicated in FIGURE 5. The racks with the angles 80 and reenforcing members 76, 78 are detached from the rivets 64, 66 (FIGURE 6) and are separately cleaned and the interior 58 of the cart, having both the doors and racks removed, is readily cleanable from both sides. The interior being free from all obstructing structure and all of the surfaces being readily available for thorough and effective cleaning, is efficiently cleaned.

After the interior of the cart is cleaned and the racks and doors are likewise cleaned the racks are reattached by means of the keyhole opening 70, 72 with rivets 64, 66 (FIGURE 6) and the doors are again hinged on the pins 48 (FIGURE 5). The cart is now ready for reloading with trays which can be again refrigerated and stored under refrigeration with the doors open and the refrigerated food then transported with the doors closed as previously described. If desired the end walls 16, 18 can be equipped with louvers 140 to promote circulation of air through the cart and reduce the time for chilling the food which is stored in the cart, the cart being in turn located in the refrigeration room.

The cart is comprised essentially of extruded and stamped aluminum parts, and for some applications it is constructed of stainless steel members. These are only examples of the kinds of materials usable, others being also usable as well.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. A storage cabinet comprising two end walls, two pairs of doors hingedly mounted on said end walls at respective corners of said cabinet and proportioned to extend between said corners and form closures at the sides of said cabinet, vertical mounting members positioned within said cabinet and providing rack supports, cushioning means surrounding said cabinet to provide protection against impacts, latching means for holding said doors in a closed position, and a rack removably supported on said rack supports within said cabinet and having vertical supports providing spaced ledges for a plurality of trays received for storage and transportation in said cabinet.

2. A storage cabinet comprising a platform having ground engaging wheels, two end walls mounted on said platform, two pairs of doors hingedly and removably mounted on said end walls at respective corners of said cabinet and proportioned to extend between said corners and form closures at the sides of said cabinet, vertical mounting members positioned within said cabinet and providing rack supports, latching means for holding said doors in a closed position, and a rack removably supported on said rack supports within said cabinet and having vertical supports providing spaced ledges for a plurality of trays received for storage and transportation in said cabinet.

3. A cart for transporting and storing trays of foods in both refrigerated and heated conditions comprising a platform having ground engaging wheels, means mounted on said platform to form end enclosure walls for said cart, a plurality of doors providing both access and closure along the sides of said cabinet between said end wall, mounting means within said cabinet, said doors being respectively hinged and being hingedly mounted on said end walls at the corners thereof for doubling each of said doors back upon themselves and for turning the doubled back doors backwardly to effect access to the interior of said cart, a plurality of racks removably supported on said mounting means and providing bearing means for receiving said trays thereon, and means forming an enclosure for the remainder of said cart which together with said doors provide an enclosure containing trays intended for storage and transport.

4. A cart for transporting and storing trays of foods in both refrigerated and heated conditions comprising a platform having ground engaging wheels, means mounted on said platform for forming enclosure walls for said cart, a plurality of doors mounted at the corners of said enclosure walls for providing both access and closure for said cabinet, said doors having hinged means for doubling each of said doors back upon themselves and having additional hinge means for mounting said doors at said corners and swinging the doubled back doors back to provide access to the interior of said cart, mounting means positioned within said cabinet, a plurality of racks removably supported on said mounting means and providing bearing means for receiving said trays thereon, means forming an enclosure for the remainder of said cart which together with said doors provide an enclosure containing trays intended for storage and transport, and latch means for selectively retaining said doors in either an open or closed position.

5. The cart of claim 4, wherein said additional hinge means permit said doors to be detached from said corners.

References Cited by the Examiner
UNITED STATES PATENTS

| | | | |
|---|---|---|---|
| 184,375 | 11/1876 | Hansen | 312—300 |
| 2,313,180 | 3/1943 | Tathwell | 312—287 |
| 2,500,609 | 3/1950 | Howard | 312—351 X |
| 2,620,079 | 12/1952 | Rosenbaum | 312—287 X |
| 3,006,709 | 10/1961 | Krey | 312—324 X |
| 3,219,405 | 11/1965 | Constantini et al. | 312—351 |
| 3,222,117 | 12/1965 | Schwartz | 211—126 X |

FOREIGN PATENTS

| | | |
|---|---|---|
| 676,024 | 5/1939 | Germany. |

CHANCELLOR E. HARRIS, *Primary Examiner.*

F. DOMOTOR, *Assistant Examiner.*